(12) United States Patent
Kawaguchi et al.

(10) Patent No.: US 11,795,980 B2
(45) Date of Patent: Oct. 24, 2023

(54) FASTENING MEMBER, STRUCTURE, AND PRINTER

(71) Applicant: SEIKO EPSON CORPORATION, Tokyo (JP)

(72) Inventors: Yuta Kawaguchi, Shiojiri (JP); Hiroaki Fukumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1133 days.

(21) Appl. No.: 16/284,147

(22) Filed: Feb. 25, 2019

(65) Prior Publication Data

US 2019/0263156 A1   Aug. 29, 2019

(30) Foreign Application Priority Data

Feb. 26, 2018   (JP) .................................. 2018-031638

(51) Int. Cl.
*F16B 5/02*   (2006.01)
*F16B 9/00*   (2006.01)
(Continued)

(52) U.S. Cl.
CPC ................. *F16B 5/02* (2013.01); *B41J 29/02* (2013.01); *F16B 7/18* (2013.01); *F16B 9/054* (2018.08)

(58) Field of Classification Search
CPC .......... F16B 9/052; F16B 9/054; F16B 9/056; F16B 12/14; F16B 12/28; F16B 12/30; F16B 9/05; F16B 2012/106; F16B 7/046; F16B 7/0453; F16B 7/0446; E04F 2011/1821; E04F 2011/1819;
(Continued)

(56) References Cited

U.S. PATENT DOCUMENTS 3,059,736 A * 10/1962 Boyd .................... F16B 41/002
                                                          403/287
8,955,266 B2 *  2/2015 Zhang ..................... H02S 20/20
                                                          52/173.3
(Continued)

FOREIGN PATENT DOCUMENTS

BR     MU9001238 U2 * 11/2012 ............. A47B 46/00
CN       205423438 U  *  8/2016 ........... A47B 88/044
(Continued)

OTHER PUBLICATIONS

Schenck Company, Screw Together Grommets, Aug. 9, 2016, Way Back Machine. (Year: 2016).*

*Primary Examiner* — Amber R Anderson
*Assistant Examiner* — Zachary A Hall
(74) *Attorney, Agent, or Firm* — WORKMAN NYDEGGER

(57) ABSTRACT

To provide a fastening member configured to fasten a hollow member including a first wall and a second wall, the first wall and the second wall facing each other, and another member having a screw hole. The fastening member includes a bolt having a screw portion to be inserted through a second hole provided on the second wall and to be screwed into the screw hole, and a case to be inserted into a first hole provided on the first wall, the case being configured to accommodate the bolt. While the case is inserted into the first hole, a tool used for a task of fastening the bolt is inserted into the case from a side of the first wall opposite to the other side of the first wall facing the second wall.

6 Claims, 7 Drawing Sheets

(51) Int. Cl.
*B41J 29/02* (2006.01)
*F16B 7/18* (2006.01)

(58) Field of Classification Search
CPC ............ E04H 17/1488; E04H 17/1452; E04H 17/1448; E04H 17/1447; E04B 1/21; E04B 1/40; E04B 2001/405; F16M 13/02; F16M 13/022
USPC ....... 248/200.1, 218.4; 211/187, 192; 57/44; 96/141, 6, 145
See application file for complete search history.

(56) References Cited

U.S. PATENT DOCUMENTS

| | | | |
|---|---|---|---|
| 9,347,471 B2 * | 5/2016 | Tseng | .................... F16B 5/0208 |
| 2015/0147133 A1 | 5/2015 | Tseng | |

FOREIGN PATENT DOCUMENTS

| | | | | |
|---|---|---|---|---|
| JP | 2005-308153 | | 11/2005 | |
| JP | 2009-280004 A | | 12/2009 | |
| JP | 2017-110748 | | 6/2017 | |
| KR | 20100133102 A | * | 12/2010 | ........... E05B 1/0015 |

\* cited by examiner

FASTENING MEMBER, STRUCTURE, AND PRINTER

BACKGROUND

The present invention relates to a fastening member, a structure having the fastening member, and a printer having the structure.

For example, it is conceivable to employ a fastening structure of a hollow member (JP-A-2009-280004).

The fastening structure of the hollow member described in JP-A-2009-280004 includes a pair of opposing walls. When a first bolt to be inserted from a work hole provided on the other wall is inserted into an attachment hole of the one wall to be screwed into a bolt hole on a fastened surface, the one wall and the fastened surface are fastened. Furthermore, when a second bolt is inserted into an attachment hole of the other wall so that the second bolt is screwed into a bolt hole of a projection seat (fastened surface) to be fitted in a notch provided in the one wall, the other wall and the fastened surface are fastened.

SUMMARY

However, in the fastening structure of the hollow member described in JP-A-2009-280004, there is a problem that when the hollow member is thickened (when a distance between the one wall and the other wall is increased), a task of appropriately placing the first bolt to be inserted from the work hole is difficult. There is also a problem that when the work hole is increased in size to facilitate the task, a rigidity of the hollow member decreases.

That is, an advantage of some aspects of the disclosure is to realize a fastening member capable of easily fastening the hollow member and the fastened surface (the other member).

The disclosure is directed to at least some of the above-described issues and can be realized as the following embodiments.

According to one embodiment, a fastening member is configured to fasten a first fastened member and a second fastened member including a first screw hole. The first fastened member is a hollow member having a first wall and a second wall, and the first wall and the second wall face each other. The fastening member includes a bolt having a screw portion to be inserted through a second hole and to be screwed into the first screw hole the second hole being provided on the second wall, and a case to be inserted into a first hole provided on the first wall, the case being configured to accommodate the bolt. While the case is inserted into the first hole, a tool used for a task of fastening the accommodated bolt is inserted into the case from a side of the first wall opposite to the other side of the first wall facing the second wall.

The fastening member according to the present application example includes a case and a bolt to be accommodated in the case (bolt to be accommodated in a cavity). In the first fastened member, the first hole and the second hole are arranged, the case is inserted into the first hole, and the bolt to be accommodated in the case is inserted through the second hole. Furthermore, the bolt is screwed into the first screw hole arranged in the second fastened member.

In the embodiment, while the case is inserted into the first hole of the first fastened member, when a worker inserts a tool into the case and fastens the bolt with the tool, the bolt is screwed into the first screw hole of the second fastened member so that the bolt is fixed to the second fastened member. That is, when the worker inserts the case into the first hole of the first fastened member, the bolt is placed at a location where the bolt can be screwed into the first screw hole. Then, when the worker fastens the bolt with the tool, the bolt is screwed into the first screw hole to be fixed to the second fastened member.

In the embodiment, a task of placing the bolt so that the bolt is screwed into the first screw hole of the second fastened member is facilitated by a task of simply inserting the case into the first hole of the first fastened member. Even when the first hollow fastened member is thick and a distance between the first wall and the second wall is long, a user may insert the case into the first hole of the first fastened member to easily place the bolt at a location where the bolt can be screwed into the first screw hole. In turn, with a simple task of fastening the bolt with the tool, it is possible to easily fix the bolt to the second fastened member.

In a fastening member according to another embodiment, the case includes a first protruding portion located at a position that is in a second direction from the screw portion, the first protruding portion being configured to restrict movement of the bolt in the second direction, and the bolt is configured to contact the first protruding portion.

The bolt contacts the first convex portion, and thus, the movement in the second direction is restricted. Therefore, even in a state where the bolt is not screwed into a screw hole, the bolt will not protrude outside from the case (in the second direction) even if the fastening member is carried by a user, for example.

In a fastening member according to another embodiment, a biasing member configured to bias the bolt in the second direction is included. The bolt includes a first flange at a position that is in the second direction from the screw portion, the case includes a second protruding portion located at a position that is in a first direction from the first flange, the first direction being opposite to the second direction, and the biasing member disposed between the first flange and the second protruding portion.

When the biasing member configured to bias the bolt toward the second direction is disposed between the first flange and the second convex portion, the bolt is pressed against the first convex portion, and thus, the bolt cannot easily move into the first direction as well as into the second direction.

In a fastening member described according to another embodiment, the case includes a washer member, as the second protruding portion, disposed at a position that is in the first direction from the first flange, the washer member includes a cylindrical portion through which the screw portion is inserted, a second flange located at a second direction end of the cylindrical portion, and a washer portion located at a first direction end in the first direction of the cylindrical portion, the washer portion contacting the second wall while the case is inserted into the first hole, and the biasing member, through which the screw portion is inserted, is disposed between the first flange and the washer portion.

In the case, in addition to the bolt, the washer member and the biasing member are accommodated.

The washer member is inserted into the screw portion of the bolt to contact the second wall of the first fastened member. That is, the washer member corresponds to a washer (for example, a washer) used when the bolt is used for fastening, and a surface contacting the second wall of the washer member corresponds to a washer face. When the bolt is fastened with a tool, the washer member is pressed, via the first flange of the bolt, against the second wall of the first fastened member, the bolt and the washer member are fixed on the second wall of the first fastened member.

That is, with a simple task of fastening the bolt with the tool, it is possible to easily fix the bolt onto the first fastened member (second wall) and it is also possible to fix the bolt to the second fastened member. Accordingly, even when the first hollow fastened member is thick, in other words, even when a distance between the first wall and the second wall is long, it is possible to easily dispose the bolt at a location where the bolt can be screwed into the first screw hole, and with a simple task of fastening the bolt with a tool, it is possible to realize the fastening member allowing the bolt to easily fasten the first fastened member and the second fastened member.

A seat member is fitted into a fitting hole of a main body and fixed at the main body. The movement of the washer member in the first direction is restricted by the seat member.

In the present application example, the first flange of the bolt, the second flange of the washer member, and the seat member are disposed in order along the first direction, and between the first flange of the bolt and the washer portion of the washer member, the biasing member is disposed. When the biasing member is disposed in a compressed state, the biasing member biases a force in the second direction toward the first flange of the bolt, and biases a force in the first direction toward the washer portion of the washer member. As a result, the bolt is pressed against the first convex portion by the biasing member to be fixed to the first convex portion (main body). The washer member is pressed against the seat member by the biasing member to be fixed to the seat member. The seat member is fixed to the main body, and thus, the washer member also is fixed to the main body.

Thus, the bolt, the washer member, the seat member, and the biasing member are fixed to the main body. Therefore, the bolt, the washer member, the seat member, and the biasing member accommodated in the case (cavity) are fixed to the case (main body), and even when the fastening member is carried by a user, these components will not protrude outside from the case.

In a fastening member according to another embodiment, while the screw portion is screwed into the first screw hole, a first direction end of the screw portion and a first direction end of the washer portion protrude in the first direction from the case.

When the bolt is fastened with a tool, the end in the first direction of the screw portion protrudes from the main body toward the first direction, and the screw portion is then screwed into the first screw hole. Furthermore, the end in the first direction of the washer portion protrudes from the main body toward the first direction and the washer member is pressed against the second wall of the first fastened member. As a result, the bolt and the washer member are fixed on the second wall of the first fastened member.

In a fastening member according to another embodiment, constituent materials of the bolt and the washer member are a metal.

The bolt and the washer member are a member configured to fasten the first fastened member and the second fastened member. When the member (the bolt and the washer member) configured to fasten the first fastened member and the second fastened member is made of metal, as compared with a case where the member is made of resin, the first fastened member and the second fastened member can be firmly fastened.

In a fastening member according to another embodiment, a constituent material of the case is a resin.

The case and the seat member are a member configured to hold a member (the bolt and the washer member) configured to fasten the first fastened member and the second fastened member. When the member (the case and the seat member) configured to hold the member (the bolt and the washer member) configured to fasten the first fastened member and the second fastened member is made of resin, as compared with a case where the member is made of metal, the fastening member can be made light.

In another embodiment, a structure includes a first fastened member that is a hollow member having a first wall and a second wall, the first wall and the second wall facing each other, a second fastened member having a first screw hole, a bolt to be inserted through a second hole and to be screwed into the first screw hole, the second hole being provided on the second wall, and a case to be inserted into a first hole provided on the first wall, the case being configured to accommodate the bolt.

The bolt, the washer member, the seat member, and the biasing member are accommodated and fixed in the case (main body), and thus, the fastening member can be carried to various locations and used for fastening a fastened member at various locations. Furthermore, the member (the bolt and the washer member) configured to fasten the first fastened member and the second fastened member is made of metal, and thus, as compared with a case where the member is made of resin, the first fastened member and the second fastened member can be firmly fastened, and a mechanical strength of the structure in which the fastening member and the second fastened member are fastened by the fastening member can be increased.

As described above, the structure in which the first fastened member and the second fastened member are fastened by the fastening member has an excellent mechanical strength. Furthermore, a portion in which the first fastened member and the second fastened member are fastened by the fastening member can be arranged at various locations of the structure.

In another embodiment, a printer includes a frame configured to support a carriage shaft, a pair of legs configured to support the frame, the one leg of the pair being a hollow member having a first wall and a second wall, the first wall and the second wall facing each other, and, a stay portion having a first screw hole, the stay portion being disposed between the pair of legs, a bolt to be inserted through a second hole and to be screwed into the first screw hole, the second hole being provided on the second wall, and a case to be inserted into a first hole provided on the first wall, the case being configured to accommodate the bolt.

The carriage shaft is an important member influencing a print quality of the printer, and a heavy item requiring a high strength (rigidity).

The pair of legs (first fastened member) and the stay portion (second fastened member) are firmly fastened by the fastening member, and thus, the mechanical strength of the pair of legs is increased and the pair of legs can stably support the heavy item (carriage shaft).

BRIEF DESCRIPTION OF THE DRAWINGS

The disclosure will be described with reference to the accompanying drawings, wherein like numbers refer like elements.

DESCRIPTION OF EXEMPLARY EMBODIMENTS

An exemplary embodiment is described below with reference to the accompanying drawings. The exemplary embodiment illustrates an aspect of the disclosure, and does not limit the invention in any way. The exemplary embodiment can be modified as desired without departing from the scope of the technical concept of the invention. Additionally, in each of the following drawings, to make each layer, each member, and the like recognizable in terms of size, each of the layers, members, and the like is illustrated in a scale different from an actual scale.

Figure 1:
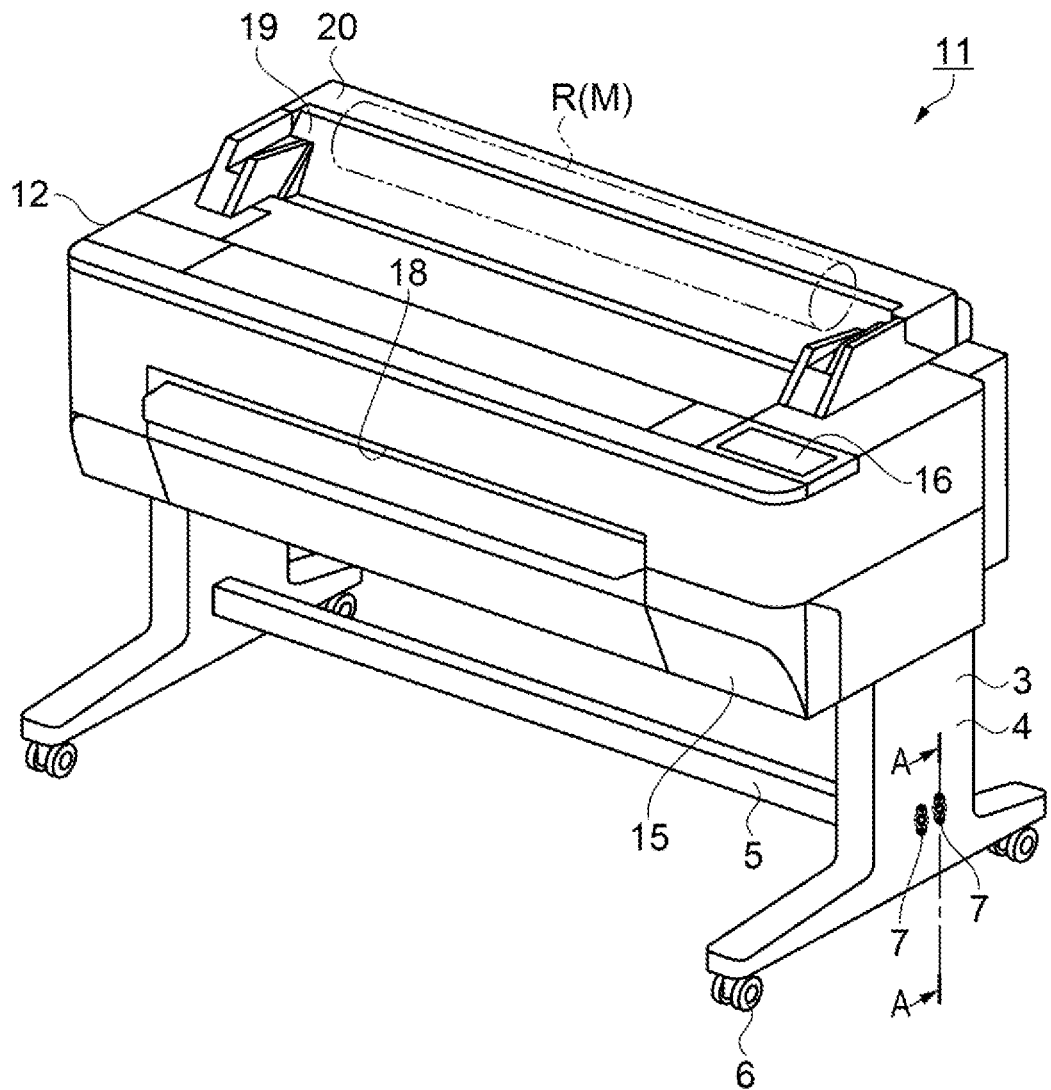
FIG. 1 illustrates a perspective view of a printer according to an exemplary embodiment.
Figure 2:
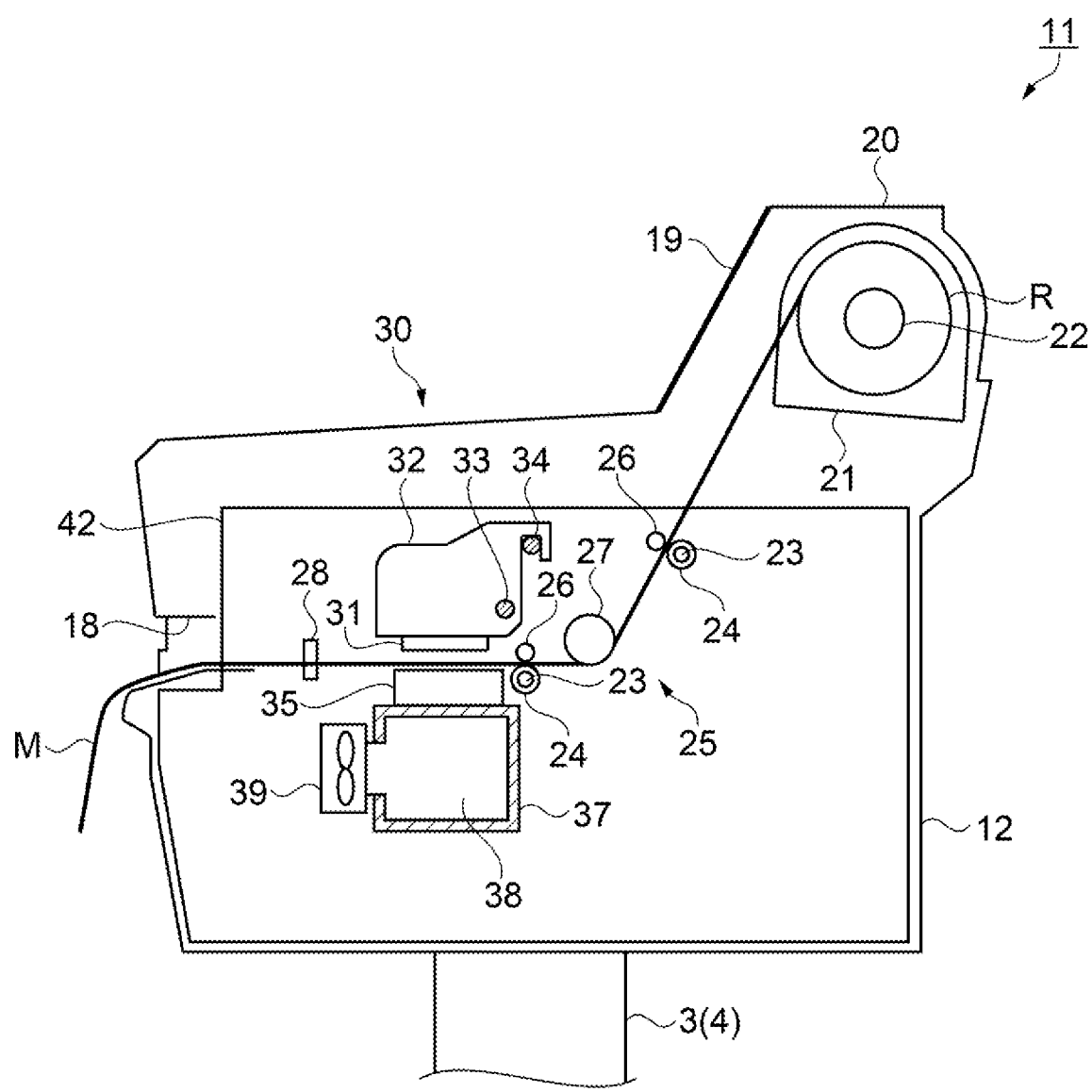
FIG. 2 illustrates a cross-sectional view illustrating a schematic configuration of the printer.

FIG. 1 is a perspective view of a printer according to an exemplary embodiment. FIG. 2 is a cross-sectional view illustrating a schematic configuration of the printer according to the exemplary embodiment.

Firstly, with reference to FIG. 1 and FIG. 2, an overview of a printer 11 will be described.

As illustrated in FIG. 1, the printer 11 according to the exemplary embodiment is a large format printer (LFP) configured to handle an elongated medium M, and includes a housing 12 in an approximately cuboid shape, a feeding unit 20 configured to feed the medium M to the housing 12, and a support unit 3 configured to support the housing 12. A discharge port 18 configured to discharge the medium M to outside of the housing 12 is opened at the front of the housing 12. An operation unit 16 is provided to be operated by a user when the user performs various settings for the printer 11 or a print instruction, on the housing 12, that is, at one end in a longer direction on a top surface of the housing 12 (at the right end in FIG. 1). Furthermore, a liquid storage unit 15 is provided at one end in the longer direction of a front of the housing 12 (at the right end in FIG. 1). The liquid storage unit 15 is configured to detachably mount liquid storage bodies (not illustrated) to store an ink such as magenta, cyan, yellow, and black.

Note that the housing 12 is an example of the "frame". Furthermore, a separate member corresponding to a "frame" may be provided in the housing 12.

The support unit 3 is an example of the "structure", and includes a pair of legs 4 as an example of the "first fastened member", a stay portion 5 as an example of "second fastened member", a wheel 6 attached to a lower end of the legs 4, and a fastening member 7.

The pair of legs 4 are pillars to support the housing 12. The stay portion 5 is a columnar member disposed between one leg 4 and the other leg 4. The pair of legs 4 and the stay portion 5 are fastened by the fastening member 7. In particular, one leg 4 and the stay portion 5 are fastened by the two fastening members 7, and the other leg 4 and the stay portion 5 are fastened by the two fastening members 7.

In other words, the support unit 3 includes the pair of legs 4 configured to support the housing 12, the stay portion 5 disposed between the pair of legs 4, and the fastening member 7 configured to fasten the pair of legs 4 and the stay portion 5.

Although the details are described later, inside the housing 12, carriage shafts 33, 34 (see FIG. 2) and the like are accommodated. When the stay portion 5 is disposed between one leg 4 and the other leg 4 and the pair of legs 4 and the stay portion 5 are fastened by the fastening member 7, a structure (support unit 3) having a mechanical strength allowing for supporting the heavy item is formed.

As illustrated in FIG. 2, the feeding unit 20 is provided to protrude upward from a rear surface of the housing 12, and a roll body R is accommodated inside the feeding unit 20. The roll body R has a cylinder-shaped core with both widthwise sides being opened. The elongated medium M is wound on the core in a cylinder form. A spindle 22 to be inserted through the core of the roll body R is provided in the feeding unit 20, and both ends of the spindle 22 are attached with roll body holding units 21 configured to rotatably hold the roll body R. The feeding unit 20 includes a door 19 configured to cover a front of the roll body R held by the pair of roll body holding units 21. A user of the printer 11 can attach and detach the roll body R to and from the feeding unit 20 while the door 19 is opened. When the roll body R is rotatably driven by a roll drive motor (not illustrated), the medium M is unwound for the roll body R to be supplied into the housing 12.

The printer 11 includes, in the housing 12, a transport unit 25 configured to transport the medium M in a transport direction and a print unit 30 configured to print the medium M.

The print unit 30 includes a printing head 31 configured to discharge ink toward the medium M, a carriage 32 configured to hold the printing head 31 to move the printing head 31 in a width direction of the medium M, and a platen 35 configured to support the medium M. The printing head 31 includes a plurality of nozzles (not illustrated), and discharges the ink. The print unit 30 includes a carriage main shaft 33 and a carriage sub shaft 34 extending along a movement direction (which is parallel to the width direction of the medium M) of the printing head 31.

Note that the carriage main shaft 33 and the carriage sub shaft 34 are an example of "carriage shaft".

The carriage 32 holding the printing head 31 is supported by the carriage main shaft 33 and the carriage sub shaft 34 extending parallel to the carriage main shaft 33. The carriage 32 reciprocates the printing head 31 along the width direction of the medium M by using the power from a carriage drive motor (which is not illustrated). The carriage 32 holding the printing head 31 is reciprocated along the carriage shafts 33, 34. The carriage shafts 33, 34 are important members influencing the movement of the printing head 31 and the print quality, are made of metal, and are heavy items extending along the width direction of the medium M.

Note that in the exemplary embodiment, the carriage 32 is configured to be supported by two shafts, that is, the carriage main shaft 33 and the carriage sub shaft 34; however, the carriage 32 may be configured to be supported by one carriage shaft.

The platen 35 includes an upper surface that is substantially rectangular and that faces the printing head 31. A longitudinal direction of the upper surface is the width direction of the medium M.

Below the platen 35, a suction room forming member 37 is assembled. The suction room forming member 37 includes a suction room 38, and an exhaust fan 39 configured to discharge an air inside the suction room 38 to outside. When the exhaust fan 39 is driven, the air inside the suction room 38 is discharged to outside, a pressure of the suction room 38 becomes negative, and the medium M supported by the platen 35 is absorbed to the top surface of the platen 35. This configuration alleviates deterioration in printing quality due to lifting of the medium M.

The transport unit 25 is located upstream of the print unit 30 in the transport direction of the medium M, and includes a transport drive roller 24 having a transport roller shaft 23 longer than the width of the medium M, a transport driven roller 26, and a transport guide roller 27.

The transport guide roller 27 guides to the print unit 30 the medium M fed from the feeding unit 20 at the upper part of the housing 12. The transport driven roller 26 is pressed toward the transport drive roller 24 and rotates in accordance with the transport drive roller 24. The transport drive roller 24 holds the medium M in between with the transport driven roller 26, and when the transport drive roller 24 is rotationally driven by a roller drive motor (not illustrated), the medium M is transported in the transport direction. In the exemplary embodiment, two transport drive rollers 24 are provided upstream and downstream of the transport guide roller 27.

In the printer 11, when a discharge operation where the print unit 30 discharges the ink from the printing head 31 toward the medium M while reciprocating the carriage 32 in an extending direction of the carriage shafts 33, 34 and a transport operation where the transport unit 25 transports the medium M are repeated, an image, a text, and the like are printed on the medium M. Furthermore, a cutter frame 28 is provided in the housing 12. The cutter frame 28 is provided downstream of the print unit 30 in a transport passage of the medium M. When a cutter is swung along the cutter frame 28, the medium M printed in the print unit 30 is cut into a predetermined size.

Figure 3:
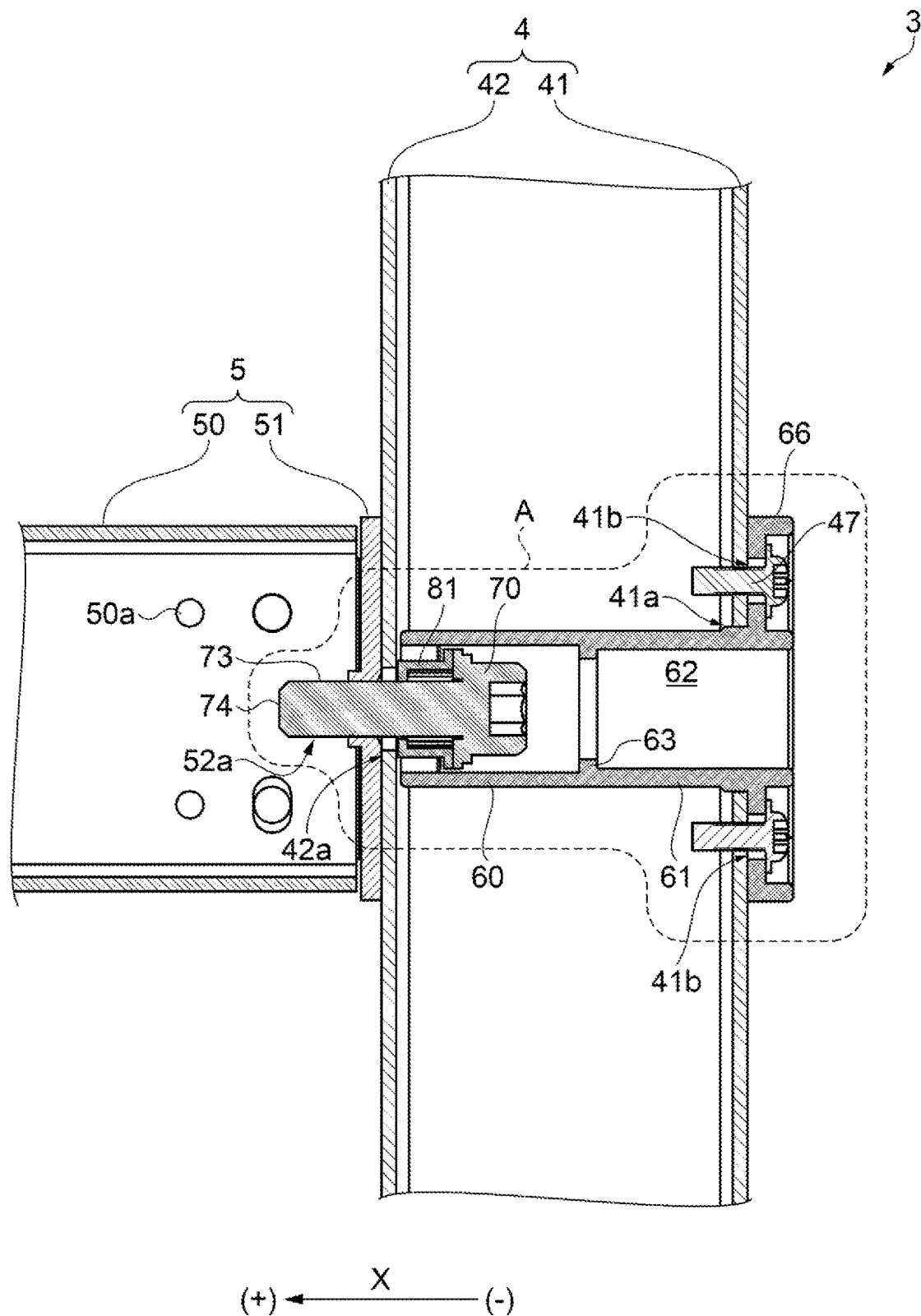
FIG. 3 illustrates a cross-sectional view of a portion fastened by a fastening member.
Figure 4:
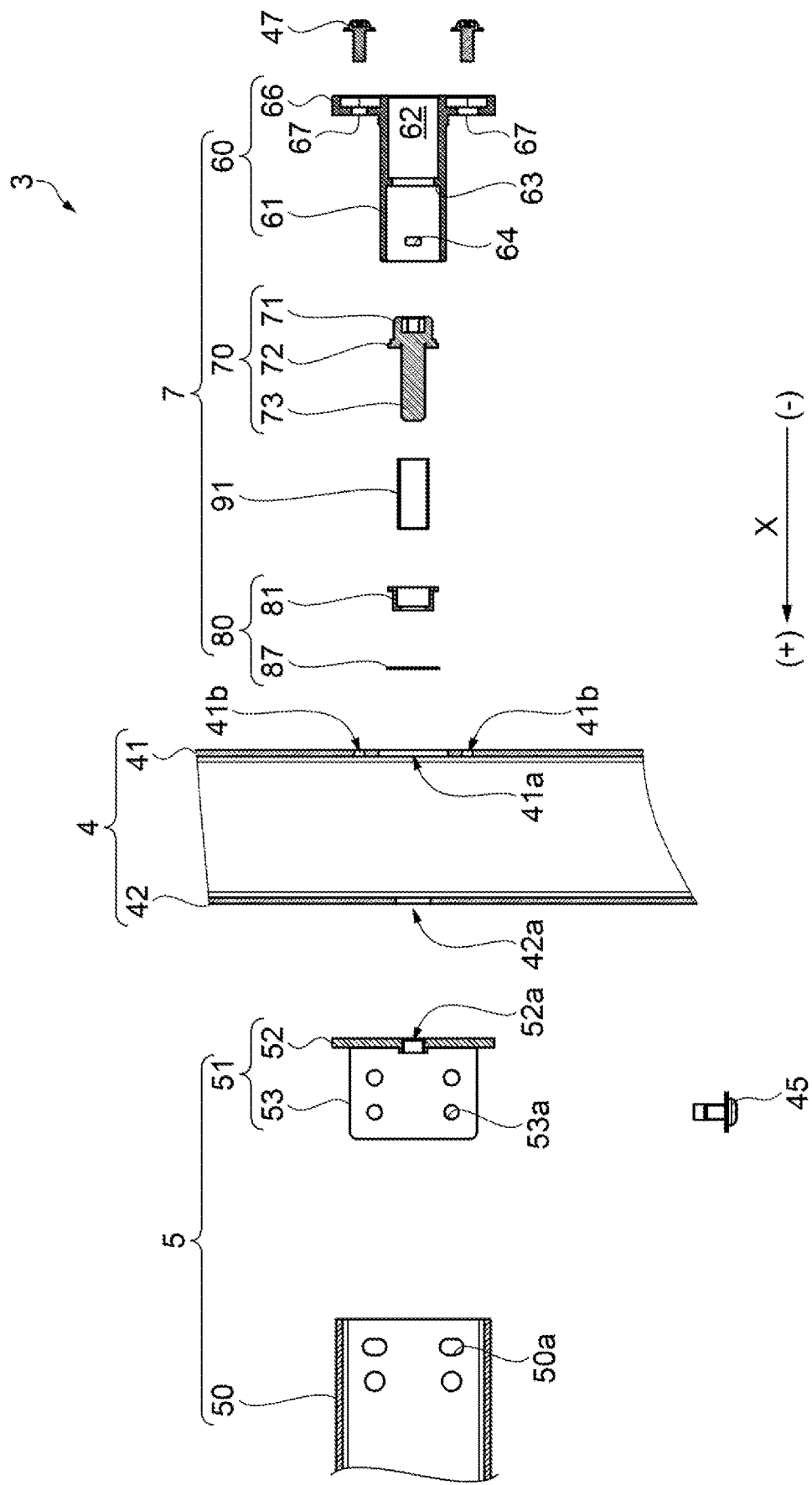
FIG. 4 illustrates an exploded cross-sectional view of the portion fastened by the fastening member.
Figure 5:
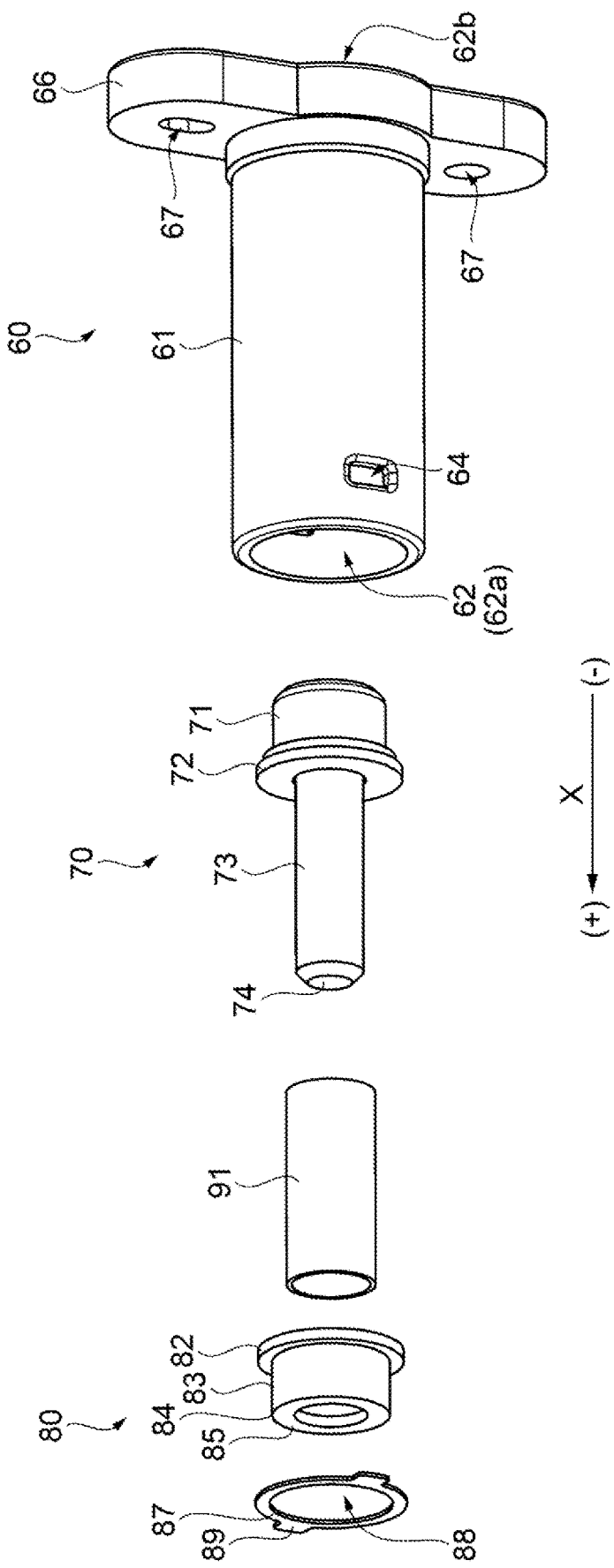
FIG. 5 illustrates an exploded perspective view of the fastening member.
Figure 6:
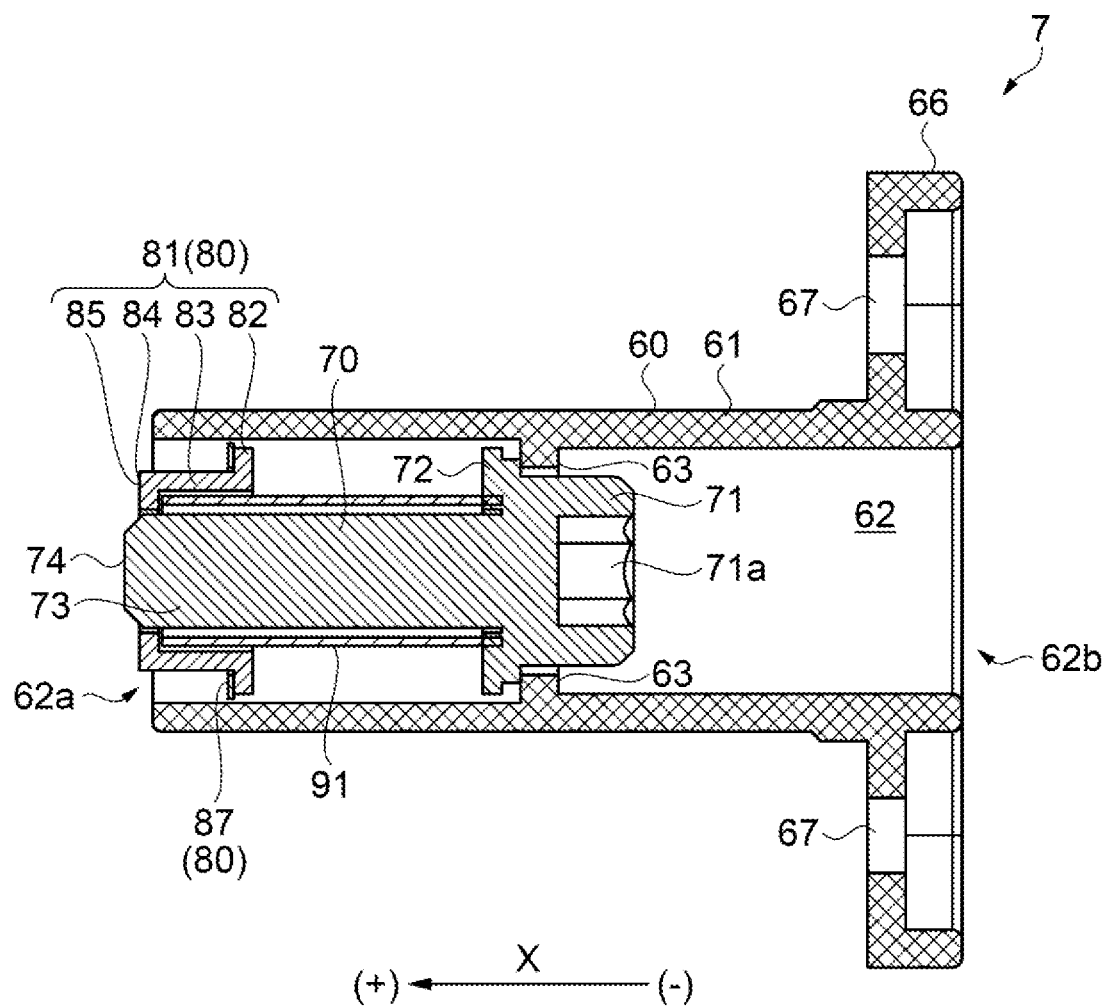
FIG. 6 illustrates a cross-sectional view of the fastening member.
Figure 7:
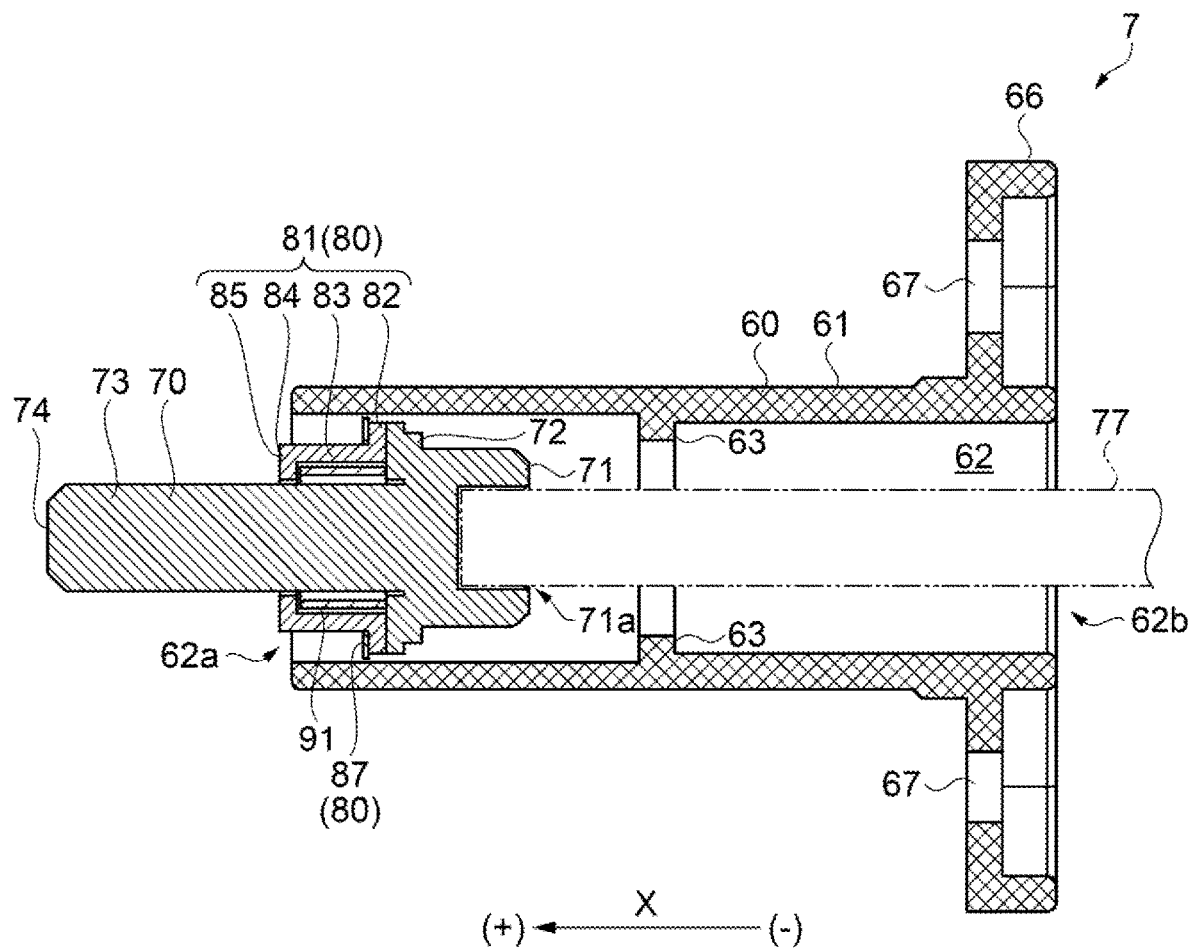
FIG. 7 illustrates another cross-sectional view of the fastening member.

FIG. 3 is a cross-sectional view of a portion fastened by the fastening member, where an A-A region of FIG. 1 is cut along an extending direction of the stay portion 5. FIG. 4, which corresponds to FIG. 3, is an exploded cross-sectional view of a portion fastened by the fastening member. FIG. 5 is an exploded perspective view of the fastening member according to the exemplary embodiment. FIG. 6 is a cross-sectional view of the fastening member according to the exemplary embodiment. FIG. 7 is an enlarged diagram of a region A surrounded by a dashed line in FIG. 3, and is another cross-sectional view of the fastening member according to the exemplary embodiment.

Note that FIG. 5 and FIG. 6 are schematic diagrams of an unused fastening member 7, and are schematic diagrams illustrating a state of the fastening member 7 obtained before the leg 4 and the stay portion 5 are fastened. FIG. 7 is a schematic diagram illustrating a state of the fastening member 7 configured to fasten the leg 4 and the stay portion 5. In FIG. 7, illustration of the pair of legs 4 and the stay portion 5 is omitted, where a tool 77 is illustrated with a two-dot chain line.

Next, with reference to FIG. 3 to FIG. 7, an overview of the portion fastened by the fastening member 7 and an overview of the fastening member 7 will be described.

As illustrated in FIG. 5, a bolt 70 that is a constituent component of the fastening member 7 includes a head 71, a first flange 72, and a screw portion 73.

In the following description, an advancing direction when the bolt is screwed or unscrewed is defined as an X direction. In addition, a leading-end side of an arrow indicating the advancing direction is defined as an X(+) direction and a base-end side of the arrow indicating the advancing direction is defined as an X(−) direction.

Note that the X(+) direction is an example of the "first direction", and the X(−) direction is an example of the "second direction".

Firstly, with reference to FIG. 3 and FIG. 4, an overview of a portion will be described where the leg 4 and the stay portion 5 are fastened by the fastening member 7.

As illustrated in FIG. 3 and FIG. 4, the leg 4 is a hollow member having a cavity therein, and is made of metal. A surface in the X(−) direction side of the leg 4 is included in a first wall 41. A surface in the X(+) direction side of the leg 4 is included in a second wall 42. On the first wall 41, a first hole 41a and a screw hole 41b penetrating through the first wall 41 are provided. On the second wall 42, a second hole 42a penetrating through the second wall 42 is provided.

A case 60 being an outer packaging of the fastening member 7 is inserted into the first hole 41a of the first wall 41. A screw 47 is screwed into the screw hole 41b of the first wall 41, the screw 47 being configured to fix the case 60 being the outer packaging of the fastening member 7 to the first wall 41. The screw portion 73 of the bolt 70 is inserted through the second hole 42a of the second wall 42. An external dimension is shorter in the order of the case 60, the screw portion 73, and the screw 47, and thus, an opening dimension is shorter in the order of the first hole 41a, the second hole 42a, and the screw hole 41b.

Note that the screw hole 41b is an example of the "second screw hole".

The stay portion 5 is made of metal, and includes a hollow main body 50 having a cavity therein, and a sheet metal 51 fixed to an end in the X(−) direction of the main body 50. A screw hole 50a is provided in the main body 50. The sheet metal 51 is made of metal, and is of bent L-letter shape. The sheet metal 51 has a part 52 disposed to block the end in the X(−) direction of the main body 50 and a part 53 fixed to the main body 50. A screw hole 52a into which the screw portion 73 of the bolt 70 is screwed is provided at the part 52 of the sheet metal 51. A hole 53a through which the screw 45 is inserted is provided at the part 53 of the sheet metal 51.

Note that the screw hole 52a is an example of the "first screw hole", and formed as a female screw.

In the stay portion 5, the screw hole 50a provided in the main body 50 and the hole 53a provided at the part 53 of the sheet metal 51 overlap planarly. When the screw 45 is inserted through the hole 53a to be screwed into the screw hole 50a, the main body 50 and the sheet metal 51 are fastened. That is, the stay portion 5 has a configuration where the main body 50 and the sheet metal 51 are fastened by the screw 45.

The stay portion 5 may be configured where the main body 50 and the sheet metal 51 are united as one through welding, for example.

The case 60 that is a constituent component of the fastening member 7 is inserted into the first hole 41a provided on the first wall 41 of the leg 4. A third flange 66 of the case 60 includes a hole 67 capable of receiving the screw 47 to be screwed into the screw hole 41b provided on the first wall 41 of the leg 4. Thus, by the screw 47, the case 60 can be fixed onto the first wall 41 of the leg 4. Furthermore, the bolt 70 that is a constituent component of the fastening member 7 includes the screw portion 73 to be inserted through the second hole 42a provided on the second wall 42 of the leg 4 and to be screwed into the screw hole 52a provided in the stay portion 5 (sheet metal 51).

Next, with reference to FIG. 5 and FIG. 6, an overview of the fastening member 7 will be described.

As illustrated in FIG. 5 and FIG. 6, the fastening member 7 includes the case 60, the bolt 70, a biasing member 91, and a second protruding portion 80. The second protruding portion 80 includes a washer member 81 and a seat member 87.

The case 60 is made of resin, and includes a main body 61, and the third flange 66 disposed at an end in the X(−) direction of the main body 61. The case 60 is inserted into the first hole 41a provided on the first wall 41 of the leg 4. The main body 61 includes a cavity 62 configured to accommodate the bolt 70, the biasing member 91, and the second protruding portion 80 (the washer member 81 and the seat member 87). That is, the fastening member 7 is configured as one unit where the bolt 70, the biasing member 91, and the second protruding portion 80 (the washer member 81 and the seat member 87) are accommodated in the case 60 (main body 61).

The cavity 62 is a hole penetrating through the main body 61, and has an opening 62a disposed at an end in the X(+) direction and an opening 62b disposed at an end in the X(−) direction. A worker can insert the tool 77 to be used for a task of fastening the bolt 70, into the cavity 62 from the opening 62b so that the tool 77 can contact the bolt 70. That is, in the main body 61 of the case 60 inserted into the first hole 41a provided on the first wall 41 of the leg 4, the cavity 62 is provided which is configured to accommodate the bolt 70 and into which the tool 77 configured to fasten the bolt 70 is inserted (see FIG. 7).

Furthermore, the main body 61 includes a first protruding portion 63 disposed at a position that is in the X(−) direction from the screw portion 73 of the bolt 70 and a fitting hole 64 disposed at a position that is in the X(+) direction from the first protruding portion 63. The first protruding portion 63 protrudes inwardly of the main body 61.

The hole 67 is provided in the third flange 66. The screw 47 to be screwed into the screw hole 41b provided on the first wall 41 of the leg 4 is inserted into the hole 67. The case 60 (third flange 66) can be fixed onto the first wall 41 of the leg 4 by the screw 47.

The bolt 70 is a sems bolt or a flanged bolt, for example. The bolt 70 is made of metal. The bolt 70 includes the head 71, the first flange 72, the screw portion 73, and an X(+) direction end 74 of the screw portion 73. The first flange 72 is disposed at a position that is in the X(+) direction from the head 71, the screw portion 73 is disposed at a position that is in the X(+) direction from the first flange 72, and the X(+) direction end 74 is disposed at a position that is in the X(+) direction from the screw portion. That is, the bolt 70 has the first flange 72 at a position that is in the X(−) direction from the screw portion 73.

In the head 71, a concave portion 71a into which the tool 77 is fitted is provided. That is, when a worker fits the tool 77 into the concave portion 71a and pivots the tool 77, the head 71 can be pivoted to fasten the bolt 70.

The first flange 72 is a portion projected from the head 71 in a direction intersecting the X direction. The first flange 72 controls a position of the bolt 70. In particular, while the first flange 72 is in contact with the first protruding portion 63 of the main body 61, the position of the bolt 70 is restricted so that the bolt 70 does not move in the X(−) direction. That is, when the first flange 72 of the bolt 70 contacts the first protruding portion 63 of the main body 61, the movement of the bolt 70 in the X(−) direction is restricted.

For example, when the bolt 70 is a sems bolt having a flat washer and a spring washer, the flat washer and the spring washer correspond to the first flange 72. In a case where a worker fastens the bolt 70 with the tool 77 to be screwed into the screw hole 52a provided in the stay portion 5 (sheet metal 51), the first flange 72 (spring washer) is deformed and a reaction force generated therefrom restricts loosening of the bolt 70.

For example, when the bolt 70 is a flanged bolt, the flange corresponds to the first flange 72. In this case, a serration (serrate portion) is provided at a rear side (in the X(+) direction) of the first flange 72, ad when the serration is deformed in a case where the bolt 70 is screwed into the screw hole 52a, a reaction force generated therefrom can restrict the loosening of the bolt 70.

The screw portion 73 has a male screw. In a state where the leg 4 and the stay portion 5 are fastened by the fastening member 7, the screw portion 73 is screwed into the screw hole 52a of the stay portion 5 (sheet metal 51) formed with a female screw. In a state where the screw portion 73 is not screwed into the screw hole 52a of the stay portion 5, the X(+) direction end 74 of the screw portion 73 protrudes from the main body 61 in the X(+) direction.

The washer member 81 is made of metal. The washer member 81 is disposed at a position that is in the X(+) direction from the first flange 72 of the bolt 70, and is fitted into the screw portion 73 of the bolt 70. The washer member 81 includes a cylindrical portion 83 through which the screw portion 73 of the bolt 70 is inserted, a second flange 82 located at the X(−) direction end of the cylindrical portion 83, a washer portion 84 disposed at the X(+) direction end of the cylindrical portion 83, and an X(+) direction end 85 of the washer portion 84. In a state where the screw portion 73 is not screwed into the screw hole 52a of the stay portion 5, the X(+) direction end 85 of the washer portion 84 protrudes from the main body 61 in the X(+) direction.

In a state where the leg 4 and the stay portion 5 are fastened by the fastening member 7, the X(+) direction end 85 of the washer portion 84 corresponds to a washer face contacting the second wall 42 of the leg 4.

The seat member 87 is made of resin. The seat member 87 is located at a position that is in the X(+) direction from the second flange 82, and restricts the movement of the second flange 82 (washer member 81) in the X(+) direction. For example, the seat member 87 is formed of lumirror (product name). The seat member 87 includes an opening 88 and a boss 89. When the opening 88 is provided in the seat member 87, the seat member 87 is fitted between the main body 61 and the cylindrical portion 83 while in contact with the second flange 82. The boss 89 of the seat member 87 is fitted into the fitting hole 64 of the case 60 (main body 61).

When the boss 89 is fitted into the fitting hole 64, the seat member 87 is fixed to the case 60 (main body 61), and is restricted from moving in the X(+) direction. Furthermore, the washer member 81 is also restricted by the seat member 87 from moving in the X(+) direction.

The second protruding portion 80 includes the washer member 81 and the seat member 87, and is disposed at a position that is in the X(+) direction from the first flange 72. In other words, the fastening member 7 includes the second protruding portion 80 disposed at a position that is in the X(+) direction from the first flange 72 and protruding toward the cavity 62 of the main body 61.

Between the first flange 72 of the bolt 70 and the second protruding portion 80, the biasing member 91 is disposed in a compressed state. In particular, between the first flange 72 of the bolt 70 and the washer portion 84 of the washer member 81, the biasing member 91 is disposed in a compressed state. The biasing member 91 includes a member having an elasticity such as a spring, and is fitted into the screw portion 73 of the bolt 70. That is, the screw portion 73 of the bolt 70 is inserted through the biasing member 91. The biasing member 91 disposed between the first flange 72 (bolt 70) and the washer portion 84 (washer member 81) in a compressed state applies a force in the X(−) direction to the first flange 72 (bolt 70) and a force in the X(+) direction to the washer member 81.

In other words, the fastening member 7 includes the biasing member 91 disposed between the first flange 72 and the second protruding portion 80 and configured to bias the bolt 70 in the X(−) direction.

The movement of the first flange 72 (bolt 70) in the X(−) direction is restricted by the first protruding portion 63 of the main body 61, and thus, when the biasing member 91 biases the force in the X(−) direction toward the first flange 72 (bolt 70), the first flange 72 (bolt 70) is pressed against the first protruding portion 63 of the main body 61 to be fixed to the main body 61.

The seat member 87 is fixed to the case 60 (main body 61), and thus, when the biasing member 91 biases the force in the X(+) direction toward the washer member 81, the washer member 81 is pressed against the seat member 87.

In this way, when the biasing member 91 is disposed in a compressed state between the first flange 72 of the bolt 70 and the washer portion 84 of the washer member 81, a part of the bolt 70 is accommodated between the washer member 81 and the seat member 87 accommodated in the case 60.

In the fastening member 7, the bolt 70, the biasing member 91, the second protruding portion 80 (the washer member 81 and the seat member 87) are accommodated in the cavity 62 of the case 60. That is, the fastening member 7 is configured as one unit so that a worker can handle the case 60, the bolt 70, the biasing member 91, and the second protruding portion 80 (the washer member 81 and the seat member 87) as one set.

The bolt 70, the biasing member 91, and the second protruding portion 80 (the washer member 81 and the seat member 87) are fixed to the case 60, or are restricted from moving by the member fixed to the case 60, and thus, even when a worker carries the fastening member 7 to various locations, a part of the configuration of the fastening member 7 will not easily fall apart. Thus, the fastening member 7 can be carried to various locations and used for fastening a fastened member at various locations. Furthermore, in the case 60, the bolt 70 can be moved in the X direction, but is biased in the X(−) direction by the biasing member 91. Thus, in a state where the screw portion 73 is not screwed into the screw hole 52a of the stay portion 5, an amount by which the X(+) direction end 74 of the screw portion 73 protrudes from the main body 61 in the X(+) direction decreases. Thus, a possibility that the screw portion 73 is damaged decreases and a worker can easily handle the fastening member 7.

Next, with reference to FIG. 7, a method of fastening, by a worker, the leg 4 and the stay portion 5 by using the fastening member 7 will be described.

When the fastening member 7 is used to fasten the leg 4 and the stay portion 5, the case 60 is firstly inserted into the first hole 41a provided on the first wall 41 of the leg 4. Furthermore, the screw 47 is inserted into the hole 67 of the third flange 66 of the case 60 (see FIG. 3) so that the screw 47 is screwed into the screw hole 41b provided on the first wall 41 of the leg 4, and the fastening member 7 (third flange 66) is fixed at a predetermined position (position at which the bolt 70 can be screwed into the screw hole 52a of the stay portion 5) on the first wall 41 of the leg 4. As a result, the bolt 70 accommodated in the case 60 is disposed at a position at which the bolt 70 can be screwed into the screw hole 52a of the stay portion 5 (sheet metal 51).

The X(+) direction end 85 of the washer portion 84 protrudes from the main body 61 in the X(+) direction, and thus, when the fastening member 7 moves in the X(+) direction, the washer member 81 (X(+) direction end 85 of the washer portion 84) of the fastening member 7 contacts the second wall 42 of the leg 4 before the main body 61 of the fastening member 7. That is, the washer face (the X(+) direction end 85 of the washer portion 84) of the washer member 81 easily contacts the second wall 42 of the leg 4.

Furthermore, the X(+) direction end 74 of the screw portion 73 protrudes from the main body 61 in the X(+) direction, and from the washer face of the washer member 81. Accordingly, when the washer face of the washer member 81 contacts the second wall 42 of the leg 4 and the bolt 70 is at a position corresponding to the second hole 42a, the X(+) direction end 74 of the screw portion 73 is disposed internally of the second hole 42a of the second wall 42 of the leg 4.

Thus, when the fastening member 7 is moved in the X(+) direction, the washer face (the X(+) direction end 85 of the washer 84) of the washer member 81 contacts the second wall 42 of the leg 4. Furthermore, when the position of the bolt 70 is adjusted while the washer face contacts the second wall 42 of the leg 4, the X(+) direction end 74 of the screw portion 73 is disposed internally of the second hole 42a of the second wall 42 of the leg 4 and the bolt 70 (screw portion 73) is disposed at a position at which the bolt 70 can be screwed into the screw hole 52a of the stay portion 5 (sheet metal 51).

Next, as illustrated in FIG. 7, the tool 77 is inserted from the opening 62b of the cavity 62 and is fitted into the concave portion 71a of the head 71 of the bolt 70. The tool 77 is a hexagonal wrench, for example. When the bolt 70 is fastened by the tool 77, the first flange 72 of the bolt 70 approaches the washer member 81, and further, the first flange 72 of the bolt 70 presses the washer member 81 toward the second wall 42 of the leg 4 so that the bolt 70 is fixed, via the washer member 81, to the second wall 42 of the leg 4.

At the same time that the bolt 70 is fastened by the tool 77, the X(+) direction end 74 of the screw portion 73 of the bolt 70 is moved in the X(+) direction and the screw portion 73 of the bolt 70 is inserted through the second hole 42a of the second wall 42 of the leg 4, and is further screwed into the screw hole 52a of the stay portion 5 (sheet metal 51) so that the bolt 70 is fixed to the stay portion 5 (sheet metal 51).

Note that in a state where the screw portion 73 is screwed into the screw hole 52a, the end 74 in the X(+) direction of the screw portion 73 and the X(+) direction end 85 of the washer portion 84 protrude from the main body 61 in the X(+) direction.

Thus, when the bolt 70 is fastened by the tool 77 to move the bolt 70 in the X(+) direction, the bolt 70 is fixed onto the second wall 42 of the leg 4 via the washer member 81 and fixed to the stay portion 5 (sheet metal 51). This results in a state where the leg 4 and the stay portion 5 are fastened by the bolt 70.

In the fastening member 7, the bolt 70 and the washer member 81 are members configured to fasten the leg 4 and the stay portion 5. The members (the bolt 70 and the washer member 81) configured to fasten the leg 4 and the stay portion 5 are made of metal, and thus, as compare to a case where the member configured to fasten the leg 4 and the stay portion 5 are made of resin, the mechanical strength is increased. Therefore, by the members (the bolt 70 and the washer member 81) configured to fasten the leg 4 and the stay portion 5, the leg 4 and the stay portion 5 are firmly fastened.

That is, a mechanical strength of a portion where the leg 4 and the stay portion 5 are fastened by the fastening member 7 is increased, and the support unit 3 that is a structure where the leg 4 and the stay portion 5 are fastened by the fastening member 7 can stably support a member such as the carriage shafts 33, 34 where a print quality is greatly influenced depending upon an accuracy of position where the member is arranged.

In the fastening member 7, the case 60 and the seat member 87 are members configured to hold the bolt 70 and the washer member 81. The case 60 and the seat member 87 are made of resin, and thus, as compared to a case where a member configured to hold a member configured to fasten the leg 4 and the stay portion 5 is made of metal, the fastening member 7 can be made light.

The invention is not limited to the above-described exemplary embodiments, but can be appropriately changed within a scope not contrary to the gist or idea of the invention which can be read from the claims and the entire specification, and a variety of modifications other than the above can be conceivable. Hereinafter modification examples are described.

In the above exemplary embodiment, the biasing member 91 biases the force in the X(−) direction to the first flange 72 (bolt 70), biases the force in the X(+) direction in the washer member 81, and the bolt 70 and the washer member 81 are fixed to the main body 61 by the forces biased from the biasing member 91. The biasing member 91 may suffice to bias a force (weak force) allowing the bolt 70 and the second protruding portion 80 (the washer member 81 and the seat member 87) to not easily protrude outside from the case 60 (main body 61), and as compared to a case where the biasing member 91 biases a strong force, the biasing member 91 can be made small and light.

As compared to the above exemplary embodiment, the biasing member 91 may be made large so that a strong force may be biased from the biasing member 91 toward the bolt 70 and the washer member 81. For example, configuration may be that when the fastening member 7 is used to fasten the leg 4 and the stay portion 5, as compared to the above exemplary embodiment, a strong force is biased from the biasing member 91 to the member (the bolt 70 and the washer member 81) configured to fasten the leg 4 and the stay portion 5, and by the force biased from the biasing member 91, the member (the bolt 70 and the washer member 81) configured to fasten the leg 4 and the stay portion 5 is not easily loosened.

The above exemplary embodiment includes a configuration where when the bolt 70 is fastened by the tool 77, the screw portion 73 of the bolt 70 is moved in the X(+) direction, and is screwed into the screw hole 52a of the stay portion 5 so that the bolt 70 is fixed to the stay portion 5.

For example, a configuration may be that the screw hole 52a of the stay portion 5 is simply a hole through which the screw portion 73 of the bolt 70 is inserted, the screw portion 73 of the bolt 70, and a nut and the screw hole 52a of the stay portion 5 are disposed in the X(+) direction, and when the screw portion 73 of the bolt 70 is moved in the X(+) direction and the screw portion 73 of the bolt 70 is screwed into the nut, the bolt 70 is fixed to the stay portion 5.

This application claims priority under 35 U.S.C. § 119 to Japanese Patent Application No. 2018-031638, filed Feb. 26, 2018. The entire disclosure of Japanese Patent Application No. 2018-031638 is hereby incorporated herein by reference.

What is claimed is:

1. A fastening member configured to fasten a first fastened member and a second fastened member having a first screw hole, the first fastened member being a hollow member having a first wall and a second wall, and the first wall and the second wall facing each other, comprising:
 a bolt having a screw portion to be inserted through a second hole in a first direction and to be screwed into the first screw hole, the second hole being provided on the second wall, the bolt comprising a first flange at a position in a second direction from the screw portion, the second direction being opposite to the first direction, the first flange being at a position in the first direction from a head having a concave portion that extends in the first direction within the head, the first flange projecting outwardly from the head and the screw portion in a third direction transverse to the first direction and the second direction;
 a biasing member configured to bias the bolt in the second direction, the biasing member being in contact with the first flange of the bolt; and
 a case to be inserted into a first hole provided on the first wall, the case being configured to accommodate the bolt, the case includes a first protruding portion located at a position that is in the second direction from the screw portion and the first flange of the bolt, the first protruding portion being configured to restrict movement of the bolt in the second direction and the bolt being configured to contact the first protruding portion, the case includes a second protruding portion located at a position that is in the first direction from the first flange, and the biasing member disposed between the first flange and a washer member, wherein
 while the case is inserted into the first hole, a tool used for a task of fastening the accommodated bolt is inserted into the case from a side of the first wall opposite to the other side of the first wall facing the second wall, and
 the case includes a washer member and a seat member, as the second protruding portion, the washer member includes:
 a cylindrical portion through which the screw portion is inserted;
 a second flange located at a second direction end of the cylindrical portion, the second flange projecting outwardly from the cylindrical portion in the third direction transverse to the first direction and the second direction; and
 a washer portion located at a first direction end of the cylindrical portion, the washer portion contacting the second wall while the case is inserted into the first hole,
 the biasing member, through which the screw portion is inserted, is disposed between the first flange and the washer portion, and
 the seat member is received within holes of the case and receives both the biasing member and the screw portion of the bolt, the seat member being located in a position that is in the first direction from the second flange and limits movement of the second flange in the first direction,
 wherein the case includes a case flange at a position that is in the second direction from the first protruding portion, the case flange extending in the third direction transverse to the second direction, a hole is formed in the case flange and is configured to receive a fastener for mounting the case to the first wall, the case and the case flange together form a T-shape.

2. The fastening member according to claim 1, wherein while the screw portion is screwed into the first screw hole, a first direction end of the screw portion and a first direction end of the washer portion protrude in the first direction from the case.

3. The fastening member according to claim 1, wherein a constituent material of the bolt and the washer member is a metal.

4. The fastening member according to claim 1, wherein a constituent material of the case is a resin.

5. A structure, comprising:
a first fastened member that is a hollow member having a first wall and a second wall, the first wall and the second wall facing each other;
a second fastened member having a first screw hole;
a bolt to be inserted through a second hole in a first direction and to be screwed into the first screw hole, the second hole being provided on the second wall, the bolt comprising a first flange at a position in a second direction from a screw portion, the second direction being opposite to the first direction, the first flange being at a position in the first direction from a head having a concave portion that extends in the first direction within the head, the first flange projecting outwardly from the head and the screw portion in a third direction transverse to the first direction and the second direction; and
a case to be inserted into a first hole provided on the first wall, the case being configured to accommodate the bolt, wherein,
a biasing member is configured to bias the bolt in the second direction, the biasing member being in contact with the first flange of the bolt, and
the case includes a first protruding portion located at a position that is in the second direction from the screw portion and the first flange of the bolt, the first protruding portion being configured to restrict movement of the bolt in the second direction and the bolt being configured to contact the first protruding portion, the case includes a second protruding portion located at a position that is in the first direction from the first flange, and the biasing member disposed between the first flange and a washer member, wherein
the case includes the washer member and a seat member, as the second protruding portion, the washer member includes:
a cylindrical portion through which the screw portion is inserted;
a second flange located at a second direction end of the cylindrical portion, the second flange projecting outwardly from the cylindrical portion in the third direction transverse to the first direction and the second direction; and
a washer portion located at a first direction end of the cylindrical portion, the washer portion contacting the second wall while the case is inserted into the first hole, and
the biasing member, through which the screw portion is inserted, is disposed between the first flange and the washer portion, and
the seat member is received within holes of the case and receives both the biasing member and the screw portion of the bolt, the seat member being located in a position that is in the first direction from the second flange and limits movement of the second flange in the first direction,
wherein the case includes a case flange at a position that is in the second direction from the first protruding portion, the case flange extending in the third direction transverse to the second direction, a hole is formed in the case flange and is configured to receive a fastener for mounting the case to the first wall, the case and the case flange together form a T-shape.

6. A printer, comprising:
a frame configured to support a carriage shaft;
a pair of legs configured to support the frame, the one leg of the pair being a hollow member having a first wall and a second wall, the first wall and the second wall facing each other;
a stay portion having a first screw hole, the stay portion being disposed between the pair of legs;
a bolt to be inserted through a second hole in a first direction and to be screwed into the first screw hole, the second hole being provided on the second wall, the bolt comprising a first flange at a position in a second direction from the screw portion, the second direction being opposite to the first direction, the first flange being at a position in the first direction from a head having a concave portion that extends in the first direction within the head, the first flange projecting outwardly from the head and the screw portion in a third direction transverse to the first direction and the second direction; and
a case to be inserted into a first hole provided on the first wall, the case being configured to accommodate the bolt, wherein,
a biasing member is configured to bias the bolt in the second direction, the biasing member being in contact with the first flange of the bolt, and
the case includes a first protruding portion located at a position that is in the second direction from the screw portion and the first flange of the bolt, the first protruding portion being configured to restrict movement of the bolt in the second direction and the bolt being configured to contact the first protruding portion, the case includes a second protruding portion located at a position that is in the first direction from the first flange, and the biasing member disposed between the first flange and a washer member, wherein
the case includes the washer member and a seat member, as the second protruding portion, the washer member includes:
a cylindrical portion through which the screw portion is inserted;
a second flange located at a second direction end of the cylindrical portion, the second flange projecting outwardly from the cylindrical portion in the third direction transverse to the first direction and the second direction; and
a washer portion located at a first direction end of the cylindrical portion, the washer portion contacting the second wall while the case is inserted into the first hole, and
the biasing member, through which the screw portion is inserted, is disposed between the first flange and the washer portion, and
the seat member is received within holes of the case and receives both the biasing member and the screw portion of the bolt, the seat member being located in a position that is in the first direction from the second flange and limits movement of the second flange in the first direction, wherein the case includes a case flange at a position that is in the second direction from the first protruding portion, the case flange extending in the third direction transverse to the second direction, a hole is formed in the case flange and is configured to receive a fastener for mounting the case to the first wall, the case and the case flange together form a T-shape.

\* \* \* \* \*